US010402870B2

(12) United States Patent
Hogg et al.

(10) Patent No.: US 10,402,870 B2
(45) Date of Patent: Sep. 3, 2019

(54) SYSTEM AND METHOD FOR INDICATING QUEUE CHARACTERISTICS OF ELECTRONIC TERMINALS

(71) Applicant: Walmart Apollo, LLC, Bentonville, AR (US)

(72) Inventors: William Hogg, Rogers, AR (US); Issa Abboud, Cave Springs, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 354 days.

(21) Appl. No.: 14/072,097

(22) Filed: Nov. 5, 2013

(65) Prior Publication Data

US 2015/0127401 A1    May 7, 2015

(51) Int. Cl.
*G06Q 10/00* (2012.01)
*G06Q 30/02* (2012.01)
*G06Q 10/06* (2012.01)
*G06Q 20/20* (2012.01)

(52) U.S. Cl.
CPC .   *G06Q 30/0281* (2013.01); *G06Q 10/063114* (2013.01); *G06Q 20/202* (2013.01)

(58) Field of Classification Search
CPC ............ G06Q 10/063; G06Q 30/0204; G06Q 30/0281
USPC ....................................................... 705/7.15
See application file for complete search history.

(56) References Cited

U.S. PATENT DOCUMENTS

| | | | | |
|---|---|---|---|---|
| 4,700,295 A * | 10/1987 | Katsof | .................. | G06Q 10/06 235/379 |
| 5,164,707 A * | 11/1992 | Rasmussen | ............ | G08B 21/18 250/221 |
| 5,557,513 A * | 9/1996 | Frey | ................... | G06Q 10/0631 705/16 |
| 5,978,772 A * | 11/1999 | Mold | ...................... | A47F 9/046 186/61 |
| 6,213,395 B1 * | 4/2001 | Dejaeger | .............. | G07G 1/0045 186/61 |

(Continued)

FOREIGN PATENT DOCUMENTS

WO         2004104888 A1    12/2004

OTHER PUBLICATIONS

Gregory E. Opara-Nadi (Electronic Self-Checkout System Vs Cashier Operated System: A Performance Based Comparative Analysis, May 2005).*

(Continued)

*Primary Examiner* — Hafiz A Kassim
(74) *Attorney, Agent, or Firm* — McCarter & English, LLP; David R. Burns

(57) ABSTRACT

Exemplary embodiments are directed to electronically computing and indicating queue characteristics for electronic terminals (e.g., POS terminals) in a specified environment, such as a store. In exemplary embodiments, queue-related information from one or more sources is received, code is executed to process the queue-related information. One or more queue characteristics are identified and/or generated for active electronic terminals in a store based on the queue-related information. Indicators are programmatically associated with the active electronic terminals to indicate the queue characteristics to one or more users to assist the one or more user in selecting one of the active electronic terminals at which to enter a transaction.

16 Claims, 6 Drawing Sheets

(56) References Cited

U.S. PATENT DOCUMENTS

| | | | |
|---|---|---|---|
| 6,296,185 B1 | 10/2001 | Dejaeger | |
| 6,313,872 B1* | 11/2001 | Borg | G08B 13/19634 348/155 |
| 6,408,279 B1* | 6/2002 | Mason | A47F 9/047 235/383 |
| 6,519,484 B1* | 2/2003 | Lovejoy | A61B 5/14552 600/323 |
| 6,697,104 B1* | 2/2004 | Yakobi | G06K 9/00778 348/143 |
| 7,685,014 B2 | 3/2010 | Dean | |
| 8,612,278 B1* | 12/2013 | Ashley, Jr. | G06Q 30/02 705/7.11 |
| 8,706,554 B1* | 4/2014 | Whitler | G06Q 20/102 705/16 |
| 2002/0074402 A1* | 6/2002 | Latimer | G06K 7/10861 235/454 |
| 2003/0044042 A1* | 3/2003 | King | G08B 17/125 382/100 |
| 2003/0197782 A1* | 10/2003 | Ashe | G07G 1/14 348/150 |
| 2004/0059614 A1* | 3/2004 | Brown | G06Q 30/0281 705/346 |
| 2005/0046570 A1* | 3/2005 | Conzola | G06Q 10/087 340/568.1 |
| 2005/0117778 A1* | 6/2005 | Crabtree | G06K 9/00771 382/103 |
| 2006/0244588 A1* | 11/2006 | Hannah | A47F 10/04 340/539.13 |
| 2007/0253595 A1* | 11/2007 | Sorensen | G07C 9/00 382/103 |
| 2007/0272734 A1* | 11/2007 | Lipton | G06Q 20/20 235/375 |
| 2008/0055423 A1* | 3/2008 | Ying | G08B 13/19684 348/211.99 |
| 2008/0059274 A1* | 3/2008 | Holliday | G06Q 10/06315 705/7.31 |
| 2008/0281553 A1* | 11/2008 | Frank | A63B 24/0021 702/150 |
| 2009/0009340 A1* | 1/2009 | Weaver | G01D 21/00 340/573.1 |
| 2009/0222388 A1* | 9/2009 | Hua | G06K 9/00778 706/12 |
| 2010/0250381 A1 | 9/2010 | Snyder | |
| 2010/0282839 A1* | 11/2010 | Zura | G06Q 10/00 235/382 |
| 2011/0081634 A1* | 4/2011 | Kurata | G01C 21/20 434/236 |
| 2011/0173081 A1* | 7/2011 | Crucs | G06Q 20/20 705/16 |
| 2011/0231419 A1* | 9/2011 | Papke | G06F 17/30793 707/756 |
| 2011/0276396 A1* | 11/2011 | Rathod | G06Q 10/00 705/14.49 |
| 2011/0280547 A1* | 11/2011 | Fan | G08B 13/196 386/239 |
| 2012/0016745 A1* | 1/2012 | Hendrickson | G06Q 10/00 705/14.53 |
| 2012/0240220 A1* | 9/2012 | Smith | G06F 21/34 726/17 |
| 2012/0281094 A1 | 11/2012 | Forshaw | |
| 2013/0002445 A1* | 1/2013 | Stibich | E05F 15/70 340/686.6 |
| 2013/0117695 A1* | 5/2013 | Hammoud | G06Q 30/00 715/761 |
| 2013/0226704 A1* | 8/2013 | Fernandez | G06Q 30/0261 705/14.58 |
| 2013/0305261 A1* | 11/2013 | Snell | G06Q 10/02 719/318 |
| 2013/0335219 A1* | 12/2013 | Malkowski | G08B 13/22 340/539.22 |
| 2014/0244207 A1* | 8/2014 | Hicks | G01C 3/00 702/150 |
| 2014/0266669 A1* | 9/2014 | Fadell | G05B 19/042 340/501 |
| 2014/0267738 A1* | 9/2014 | Allen | G06K 9/00771 348/156 |
| 2014/0278645 A1* | 9/2014 | Davidson | G06Q 10/063114 705/7.15 |

OTHER PUBLICATIONS

CK Andrews (Do-It-Yourself': Self-checkouts, Supermarkets, and the Self-Service Trend in American Business, 2009).*

Gregory E. Opara-Nadi (Electronic Self-Checkout System Versus Cashier Operated System: a Performance Based Comparative Analysis, May 2005). (Year: 2005).*

Christopher K. Andrews ('Do-It-Yourself': Self-Checkouts, Supermarkets, and the Self-service Trend in American Business, Doctor of Philosophy, 2009). (Year: 2009).*

PCT International Patent Search Report and Written Opinion dated May 20, 2015 for PCT International Patent Application No. PCT/US2014/063631.

* cited by examiner

SYSTEM AND METHOD FOR INDICATING QUEUE CHARACTERISTICS OF ELECTRONIC TERMINALS

BACKGROUND

A customer's experience at a store can be negatively impacted if the customer has to wait in a long line to purchase items. In an attempt to avoid long lines, the customer may look for a line that provides the fastest way to get through a checkout process. For example, a customer may attempt to assess which checkout line has the fewest people in it and may attempt to assess which line has people with the fewest items before selecting a checkout line in which to wait. Even after a customer has selected a checkout line the customer may continue to observe the other checkout lines to determine whether she should change lines. While this approach can be effective in certain circumstances, it can burden the customer and detract from their experience in the store. Furthermore, the customer typically does not and/or cannot account for the various variables that contribute to a wait time in a queue, such as a cashiers historical and/or contemporaneous performance, historical and/or contemporaneous metrics associated with specific registers, and so on.

SUMMARY

Exemplary embodiments are directed to electronically computing and indicating queue characteristics for electronic terminals (e.g., POS terminals) in a specified environment, such as a store. In exemplary embodiments, queue-related information from one or more sources is received, code is executed to process the queue-related information. One or more queue characteristics are identified and/or generated for active electronic terminals in a store based on the queue-related information. Indicators are programmatically associated with the active electronic terminals to indicate the queue characteristics to one or more users to assist the one or more user in selecting one of the active electronic terminals at which to enter a transaction.

In accordance with embodiments of the present disclosure, a computer-implemented method of indicating queue characteristics for electronic terminals is disclosed. The method includes receiving queue-related information from one or more sources in a computer-readable format, executing code to process the electronic queue-related information to provide queue characteristics for active electronic terminals in a specified environment, and programmatically associating indicators with the active electronic terminals to indicate the queue characteristics to one or more users to assist one or more customers in selecting one of the active electronic terminals at which to enter a transaction.

In accordance with embodiments of the present disclosure, a queue monitoring system for indicating queue characteristics of electronic terminals is disclosed that includes a non-transitory storage device and a processing device. The non-transitory computer-readable medium stores executable instructions for implementing a computing process of indicating queue characteristics for active electronic terminals. The processing device is programmed to execute the instructions to receiving electronic queue-related information from one or more sources in a computer-readable format, executing code to process the electronic queue-related information to provide queue characteristics for active electronic terminals in a store, and programmatically associating indicators with the active electronic terminals to indicate the queue characteristics to one or more users to assist the one or more user in selecting one of the active electronic terminals at which to enter a transaction.

In accordance with embodiments of the present disclosure, a non-transitory computer-readable medium storing instructions is disclosed. Execution of the instructions by a processing device causes the processing device to implement a process of indicating queue characteristics that includes receiving electronic queue-related information from one or more sources in a computer-readable format, executing code to process the electronic queue-related information to provide queue characteristics for active electronic terminals in a store, and programmatically associating indicators with the active electronic terminals to indicate the queue characteristics to one or more users to assist the one or more user in selecting one of the active electronic terminals at which to enter a transaction.

In some embodiments, the queue-related information includes at least one of contemporaneous electronic terminal information or historical electronic terminal information. In some embodiments, the queue-related information includes at least one of contemporaneous cashier information or historical cashier information. In some embodiments, the queue-related information includes information received from a sensor in the store.

In some embodiments, the queue characteristics include an estimated queue wait time for each of the active electronic terminals.

In some embodiments, the indicators are light sources disposed proximate to the electronic terminals and the method further comprises programmatically controlling the light sources to energize or de-energize the light sources according to the queue characteristics. The light sources output a green light to indicate a favorable queue characteristic, a yellow light to indicate a neutral queue characteristic, or a red light to indicate a unfavorable queue characteristic.

In some embodiments, customer specified preferences are received via an electronic device operated by a customer, code is executed to process the customer specified preferences to compare the customer preferences to the queue characteristics, and the customer is alerted in response to satisfaction of the customer preference.

In some embodiments, a portable electronic device receives communications to display the indicators on a display of the portable electronic device. In some embodiments the indicators are displayed via at least one display unit in the store.

In some embodiments, the queue characteristics can be output to an employee scheduling system.

Any combination of embodiments is envisioned. Other objects and features will become apparent from the following detailed description considered in conjunction with the accompanying drawings. It is to be understood, however, that the drawings are designed as an illustration only and not as a definition of the limits of the present disclosure.

DESCRIPTION OF EXEMPLARY
EMBODIMENTS

Exemplary embodiments of the present disclosure are directed to providing one or more indicators to customers of a store and/or store employees to indicate queue characteristics associated with point-of-sale (POS) terminals (e.g., electronic terminal) based on queue-related information. Exemplary embodiments can be utilized to advantageously aid customers in finding and selecting a POS terminal queue (e.g., a checkout line) based on, for example, estimated wait times associated with POS terminals, customer proximity to the POS terminals, a proficiency of the employees operating the POS terminals to perform tasks required by the customers, and/or any other suitable queue characteristics. While exemplary embodiments are described herein with respect to a retail commerce environment, those skilled in the art will recognize that exemplary embodiments of the present disclosure can be implemented to indicate queue characteristics for teller lines or ATM lines for banks, road toll lines, customs, lines at fast food restaurants, and/or any other suitable environment in which there are lines of people waiting to be serviced.

Figure 1:
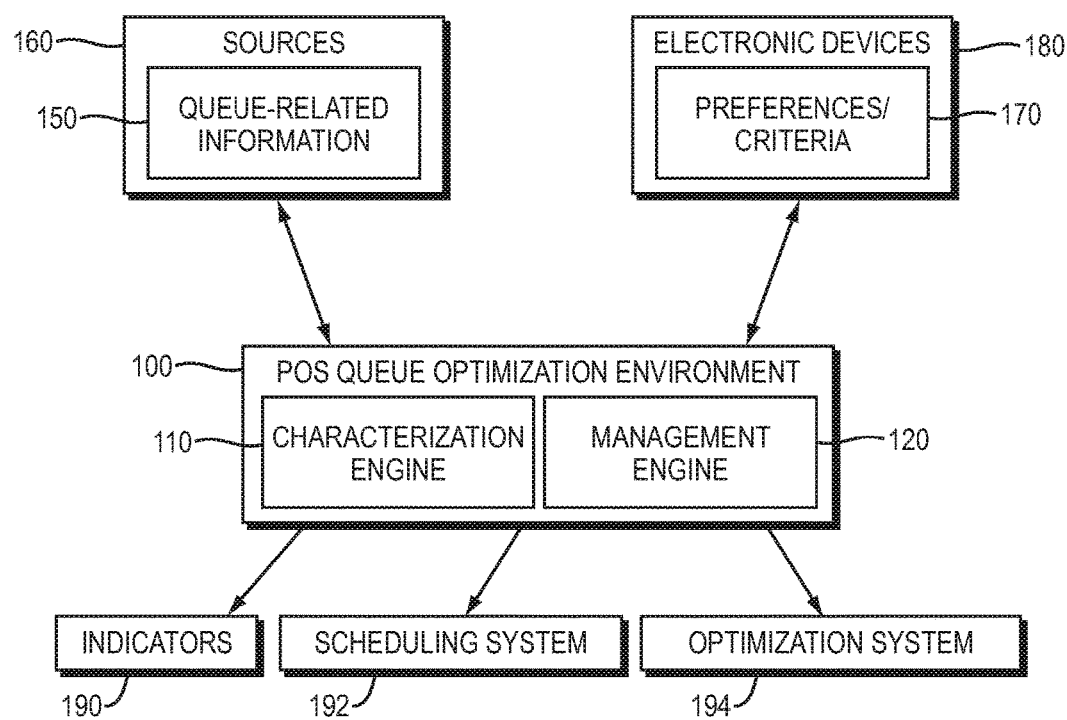
FIG. 1 is a block diagram of retail sales system that can be implemented in accordance with exemplary embodiments of the present disclosure.

FIG. 1 is a block diagram of an POS queue optimization environment 100 that can be implemented using hardware, software, and/or a combination thereof. For example, in one exemplary embodiment, one or more computing devices can be programmed and/or configured to implement exemplary embodiments of the environment 100. An exemplary embodiment of a computing device configured to implement embodiments of the environment 100, or portions thereof, is shown, for example, in FIG. 5. The environment 100 can include a characterization engine 110 and a management engine 120. While an exemplary embodiment of the environment 100 has been illustrated with the characterization engine 110 and the management engine 120, those skilled in the art will recognize that engines 110 and can be integrated with each other to form a single engine. Furthermore, while an exemplary embodiment of the environment 100 includes the engines 110 and 120, those skilled in the art will recognize that each of the engines 110 and 120 can be implemented as several as several different engines such that the operation of the each of the n engines 110 and 120 can be performed by a combination of engines.

In exemplary embodiments, the environment 100 can be programmed and/or configured to receive queue-related information 150 from one or more sources 160 and/or customer specified criteria/preferences 170 from customers via electronic devices 180 (e.g., mobile telephones, tablets, in-store provided scanners, and the like) associated with the customers. The queue-related information 150 and/or customer specified criteria/preferences 170 can be utilized by the environment 100 to provide queue characteristics associated with point-of-sale terminals, such as, for example, estimated queue wait times for POS terminals (e.g., electronic terminals) in a store, customer proximity to the POS terminals, and a proficiency of the employees operating the POS terminals to perform tasks required by the customers, and/or any other suitable queue characteristics. The queue-related information 150 can include contemporaneous and/or historical information. The queue characteristics can be utilized by the environment 100 to provide one or more visual and/or audio indicators 190 to one or more customers, employees, and/or any other suitable persons.

The contemporaneous queue-related information can include contemporaneous (e.g. "real-time") information about the POS terminals and/or the employees operating the POS terminals. Contemporaneous POS terminal information can include, for example, identities of active POS terminals, a location of the active POS terminals in the store (e.g., a Garden department, TLE department, Electronics department, Pharmacy department, Front end, etc.), a type of POS terminal (e.g., terminals configured to weigh items, terminals configured to scan price look-up codes (PLUs), terminals configured for regular item scanning, terminals configured for self-checkout, etc.), peripheral POS terminal equipment at the active POS terminals (e.g., scales, credit/debit card readers, near field communication (NFC) readers, etc.), identities of cashiers currently operating the POS terminals, a current queue depth for the active POS terminals, a current queue density for the active POS terminals (e.g., average quantity of items per customer in the queue), and the like. Contemporaneous employee information can include information about the performance of cashiers operating the POS terminals, such as a current item per hour (IPH) scan rate, a current quantity of customer transactions per hour, a current quantity of inactive time between customers, an estimated performance of the cashier, and the like. The estimated performance of the cashier can be determined based on one or more of a quantity of items processed per customer, a physical size of items being handled by the cashier, a type of item entry being utilized by the cashier, and the like.

The historical information can include historical (e.g. past) information about the POS terminals and/or the employees operating the POS terminals. Historical POS terminal information can include, for example, past information related to a quantity of items scanned per hour for a POS terminal, customers per hour for a POS terminal, and the like. Historical employee information can include, for example, an average item per hour scan rate, average customers per hour (CPH), average dwell time between transactions (e.g., time that a cashier is not engaged in a transaction), average basket size (e.g., a quantity of items per transaction), average performance, and the like.

The characterization engine 110 can receive queue-related information 150 as an input from the one or more sources 160 and can be programmed and/or configured to process the queue-related information to identify and/or generate queue characteristics of the POS terminals in the store. In some embodiments, the queue characteristics identified and/or generated by the characterization engine 110 can include, for example, estimated queue wait times associated with POS terminals, customer proximity to the POS terminals, a proficiency of the employees operating the POS terminals to perform tasks required by the customers, and/or any other suitable queue characteristics.

For embodiments in which the queue characteristics include a queue wait time, the characterization engine 110 can programmed to generate as an output the estimated queue wait times by executing one or more algorithms. As one example, the characterization engine 110 can be programmed and/or configured to estimate and output queue wait time for each POS terminal based on a current queue depth D, an average basket size S, and an average item scan rate R, as defined by the following mathematical expression:

$$W=D*S/R \qquad (1)$$

While Eq. 1 above illustrates an exemplary mathematical expression for estimating a queue wait time, those skilled in the art will recognize that exemplary embodiments can implement other algorithms using the queue-related information 150 as an input. For example, exemplary embodiments of the present disclosure can utilize one or more algorithms disclosed in co-pending U.S. patent application Ser. No. 14/071,914 entitled "Performance Evaluation System For Stores" filed on Nov. 5, 2013, the disclosure of which is incorporated by reference herein. Furthermore, while an estimated queue waiting time is used to illustrate an exemplary queue characteristic, those skilled in the art will recognize that exemplary embodiments can identify and/or generate other queue characteristics, such as a customer proximity to the POS terminals (e.g., which queue is closest), a proficiency of the employees operating the POS terminals to perform tasks required by the customers (e.g., a rate at which the employees perform transactions), and/or any other suitable queue characteristics.

In some embodiments, the characterization engine 110 can be programmed and/or configured to apply weighting factors to some of the inputs (e.g., queue-related information) before determining the queue characteristics (e.g., an estimated wait time for each of the POS terminals). The weighting factors can be specified by the characterization engine 110 and/or can be specified by a user interacting with the environment 100. The weighting factors can allow the environment 100 to place more or less importance on a specified input when identifying and/or generating the queue characteristics.

In some embodiments, the characterization engine 110 can be programmed and/or configured provide a bias to one or more of the POS terminals (e.g., a value or weighting to skew the processing to favor one or more POS terminals over other POS terminals) so that the POS terminals receiving the bias can be identified or recommended to customers as having a favorable queue characteristic. The bias can be applied for individual POS terminals and/or a group of POS terminals (e.g., front end POS terminals, pharmacy department POS terminals) prior or subsequent to identifying and/or generating queue characteristics for the POS terminals. The bias can be specified by the characterization engine 110 and/or by a user of the environment 100 and can be used by the environment 100 to attempt to influence which POS terminals are selected by the customers.

In some embodiments, the characterization engine 110 can be programmed and/or configured to apply a self-checkout factor to queue characteristics for POS terminals implementing an automated process that can be used by customers to scan and pay for the items they wish to purchase. The self-checkout factor can be used as an input by the characterization engine 110 to account for training of a user to use a self-checkout POS terminal and/or an average transaction time per item. By applying the self-checkout factor to the queue characteristics, exemplary embodiments of the present disclosure can provide customers with an assessment of whether a self-checkout queue favorable option for checking out (e.g., the self-checkout POS terminal may be faster or slower than an employee operated POS terminal).

The management engine 120 can utilize the queue characteristics identified and/or generated by the characterization engine 110 as an input to perform one or more operations or task. For example, in exemplary embodiments, the management engine 120 can be programmed and/or configured to utilize the queue characteristics as an input to output or provide visual and/or audio indicators 190 corresponding to the queue characteristics received from the characterization engine 110 to customers, employees, and/or any other persons. In exemplary embodiments, employees of the store can use the indicators 190 to assist customers in selecting a POS terminal at which to checkout and/or to determine whether to activate or deactivate POS terminals to maintain a desired queue characteristic. Customers can use the indicators 190 to select a POS terminal queue in which to wait to checkout.

In some embodiments, the management engine 120 can transmit notifications to electronic devices operated by employees (e.g., supervisors, managers, etc.) to notify the employees of which queues have unfavorable queue characteristics (e.g., long queue wait times) to allow the employees to make immediate and/or future adjustments to the utilization of the POS terminals (e.g., staffing of the POS terminals, a quantity of POS terminals to activate, etc.). The management engine 120 can notify employees when queue characteristics change for one or more POS terminals. For example, when a queue characteristic changes from favorable to neutral or unfavorable, the management engine 120 can transmit a notification to the electronic device associated with the employee so that the employee can take action to reduce or increase the number of open lanes.

The management engine 120 can be programmed and/or configured to energize, directly or through intermediate device(s), light sources associated with the POS terminal, as described herein, to provide different colors based on the queue characteristics (e.g., estimated queue wait times associated with each POS terminal). In some embodiments, the light sources can include a red light to indicate an unfavorable queue characterization (e.g., a long queue wait time), a yellow light to indicate a neutral queue characterization (e.g., an intermediate queue wait time), a green light to indicate a favorable queue characterization (e.g., a short queue wait time). In some embodiments, light sources associated with queues for POS terminals having unfavorable queue characteristics (e.g., non-preferred by the environment 100, customer, and/or employees), such as long queue wait times, can be de-energized (e.g., have no light), while queues for POS terminals having favorable queue characteristics (e.g., preferred by the environment 100, customer, and/or employees), such as short queue wait times, can be energized.

The management engine 120 can be programmed and/or configured to communicate, directly or indirectly through an intermediate device, with one or more display devices in the store to display an indicator of the queue characteristics (e.g., estimated queue wait times for the POS terminals). The indicators displayed can include a value of the queue characteristics (e.g., a numerical value of estimated queue wait times), a red graphic/icon to indicate an unfavorable queue characterization (e.g., a long queue wait time), a yellow graphic/icon to indicate a neutral queue characterization (e.g., an intermediate queue wait time), a green graphic/icon to indicate a favorable queue characterization (e.g., a short queue wait time).

The management engine 120 can be programmed and/or configured to transmit indicators, directly or indirectly through an intermediate device, to one or more portable electronic devices, which may be carried by employees, customers, and/or any other persons. The indicators can be displayed to the users of the portable electronic devices to provide an indication to the users of the queue characteristics (e.g., estimated queue wait times of the POS terminals). In some embodiments, the indicators displayed by the portable electronic device can be the identical or similar to the indicators utilized by the display devices described herein.

In exemplary embodiments, the management engine 120 can be programmed and/or configured to provide customers with recommendations as to which POS terminal they should use based on a queue characteristic (e.g., an estimated queue wait time) as well as customer-specified criteria/preferences 170, which can be maintained by the management engine 120. The customer-specific criteria 170 can include parameters received from the customer and/or parameters associated with the customer received from sources other than the customer. The parameters received from the customer can include, for example, a preferred cashier, a preferred POS terminal, a maximum estimated queue wait time, a preferred exit location, a maximum quantity of items per transaction associated with a POS terminal, a location of the POS terminal, a maximum distance between the customer and the POS terminal, and the like. The parameters received from a source other than the customer can include, for example, information about past purchases (e.g., to identify items purchased, a frequency with which the items are purchased, an average quantity of items purchased per transaction), demographic information, and the like.

For embodiments utilizing customer specified criteria 170 providing a condition (e.g., a maximum amount of time a customer is willing to wait in line), the management engine 120 can be programmed and/or configured to forecast when the condition will be satisfied and/or can determine whether the queue characteristics (e.g., estimated wait times) of any of the POS terminals satisfy the condition. The management engine 120 can provide alert and/or recommendations to the customer in response to a determination that the condition has been satisfied (e.g., the estimated wait time of a POS terminal is less than the maximum about of time the customer is willing to wait). For example, the management engine 120 can be programmed and/or configured to instruct, directly, or indirectly through an intermediate device, the customer's portable electronic device to display one or more indicators to indicate that the condition has been satisfied by one or more of the POS terminals. By forecasting and/or providing alerts when the condition is satisfied, the environment 100 can advantageously allow customers to continue to shop while waiting for the condition to be satisfied.

In some embodiments, a customer's location information can be used to by the management engine 120 to determine which POS terminal queue to recommend. For example, the engine can be programmed and/or configured to receive location information associated with a customer's portable electronic device (e.g., from a GPS enable mobile device) and/or based on triangulation of a wireless transmission signal from the customers device. For embodiments, in which the customer provides a maximum distance to a POS terminal, the management engine 120 can recommend the closest POS terminal queue within the maximum distance that has the most favorable queue characteristic (e.g., the shortest queue wait time). As another example, sensors may detect through which entrance/exit a customer enters the store (e.g., based on a wireless transmission from the customers portable electronic device), and the management engine 120 can recommend the POS terminal queue closest within a specified distance to the entrance/exit that has the most favorable queue characteristic (e.g., the shortest queue wait time).

In some embodiments, the management engine 120 can be programmed and/or configured to automatically adjust POS terminal queue alerts and/or recommendations based on feedback corresponding to an accuracy of previous alerts and/or recommendations. In some embodiments, the management engine 120 can be programmed and/or configured to provide customers with incentives to go to POS terminals having less favorable queue characteristics. In some embodiments, the queue characteristics can be provided to other systems, such as, for example, a staff scheduling system 192 programmed and/or configured to generate work schedules for employees, register utilization optimization system 194 programmed and/or configured to determine whether POS terminals in a store or stores are being utilized effectively and efficiently, and/or any other suitable systems that can utilize the output of environment 100.

Figure 2:
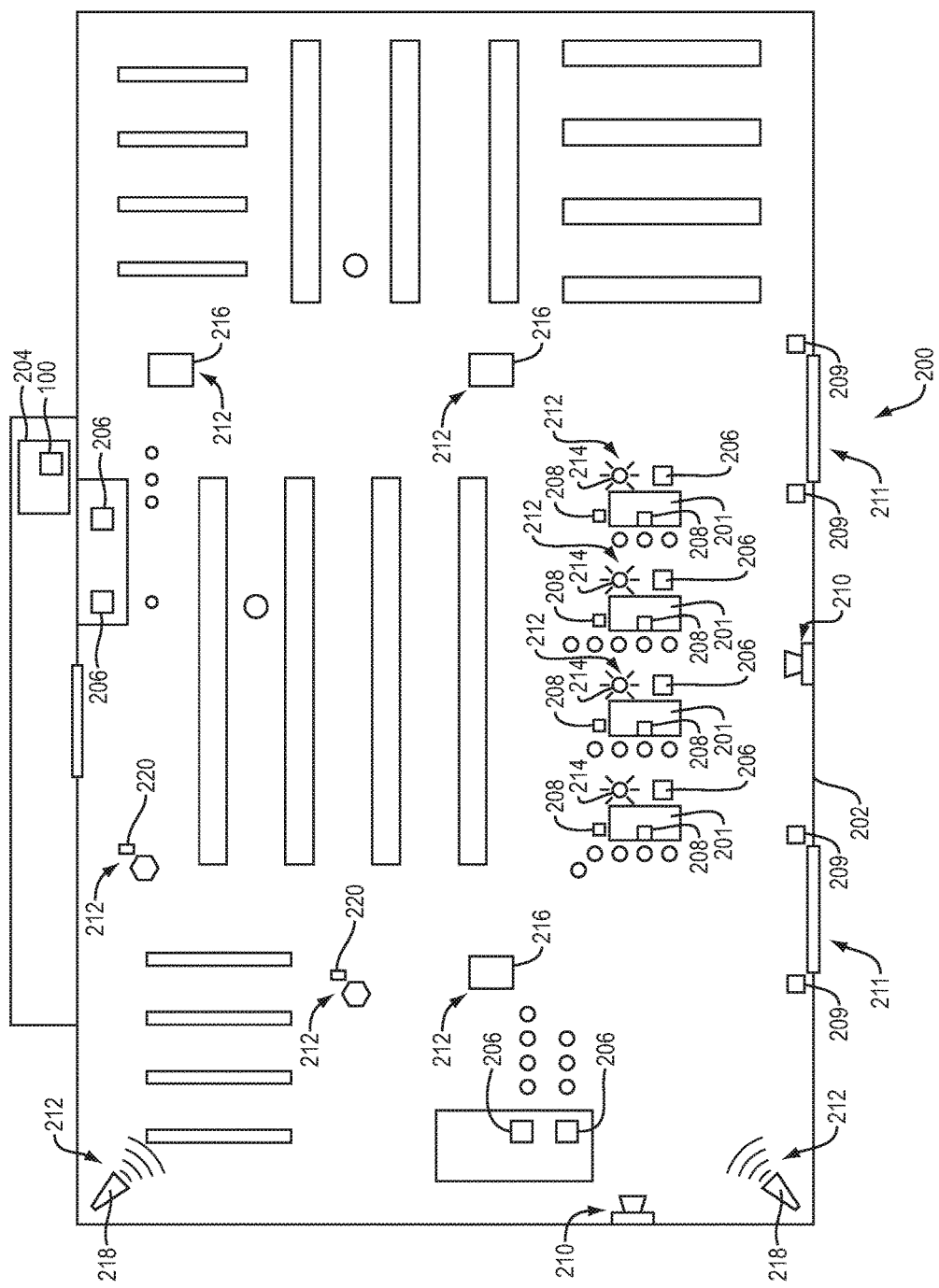
FIG. 2 depicts an exemplary embodiment of a system in a store utilizing an embodiment of the retail sales system in accordance with the present disclosure.

FIG. 2 depicts an exemplary embodiment of a retail sales system 200 in a store 202 utilizing an embodiment of the environment 100. As shown in FIG. 2, the system 200 can include a computing device 204 (e.g., a server) executing an embodiment of the environment 100, POS terminals 206 distributed throughout the store 202, sensors 208 disposed proximate to the POS terminals 206, sensors 209 disposed proximate to entrances 211, video cameras 210 distributed throughout the store 202, and indicator devices 212 (including light sources 214, display devices 216, audio devices 218, portable electronic devices 220). The computing device 204 can be in (wired and/or wireless communication with the POS terminals 206, sensor 208, video cameras 210, and indicator devices 212 to receive and/or output information/data to the POS terminals 206, sensor 208, video cameras 210, and indicator device 212. In some embodiments, the computing device 204 may be located locally in or near the store or may be located remotely, for example, in another town, state, or country.

The POS terminals 206 can be computing devices programmed and/or configured to perform transactions and/or to monitor usage to generate POS terminal information. For example, in some embodiments, the POS terminals can be programmed and/or configured to record transaction times, items per transaction, items scanned per hour, basket sizes (e.g., a quantity of items for transactions), and/or other POS terminal information. In some embodiments employees operating the POS terminals 206 can be prompted to periodically enter a quantity of customers in their line (e.g., a queue depth/length) and the POS terminals can transmit the entered information to the computing device 204 to be processed by the environment 100. For example, the environment 100 can use the information recorded by the POS terminal and/or entered by the employee to identify and/or generate queue characteristics for the POS terminals 206 (e.g., estimate queue waiting times).

The sensors 208 can be optical sensors, infrared sensors, acoustic sensors, and/or any other suitable sensors that can be used by the environment 100 to sense characteristics of a queue depth/length. In the present embodiment, the sensors 208 can be disposed at the midpoint and/or rear of conveyor belts 201 associated with the POS terminals 206. The sensors 208 can detect the presence or absence of customers waiting in queue for the POS terminals 206. The environment 100 can use the output of the sensors 208 as an input to determine a depth/length of the queues for the POS terminals 206 and to estimate queue waiting times for the POS terminals 206.

The sensors 209 can be disposed proximate to the entrance/exit 211 to detect which entrance/exit the customer used to enter the store 202. In some embodiments, this information can be processed by the environment 100 when providing a recommendation of a POS terminal queue to the customer. For example, the management engine 120 of the environment 100 can be programmed and/or configured to specify only POS terminal within a specified distance to the entrance can be recommended and the management engine 120 can select the POS terminal(s) within the specified distance that have the most favorable queue characteristics.

Video cameras 210 can capture video of areas including the POS terminals 206. The video analytics can be used to determine a queue length/depth for the queues. For example, in exemplary embodiments, the environment 100 can use video analytics to recognize a quantity of customers waiting in the queues for the POS terminals 206, which can be used by the environment 100 to estimate queue waiting times for the POS terminals 206.

The indicator devices 212 can be configured to output and/or display indicators corresponding to the queue waiting times for the POS terminals 206. For example, the indicator devices can be in communication with the computing device 204 to facilitate interaction between the environment 100 and the indicator device 212 to output and/or display the indicators to the employees, customers, and/or any other persons in response to outputs transmitted by the system (e.g., via the computing device 204) directly and/or indirectly to the indicator device 212.

In some embodiments, the light sources 214 can be disposed proximate to the POS terminals 206 and can be illuminated to provide an indication of queue waiting times for the POS terminals 206. As an example, in some embodiments, the light sources 214 can be energized to indicate that the queue waiting times are short in response to an output from the environment 100 and can be de-energized to indicate that the queue waiting times are long in response to an output from the environment 100, or vice versa. As another example, in some embodiments, each POS terminal 206 can be associated with a light source that can output different colors or can have separate light sources for each color. The different color light sources 214 can be energized/de-energized in response to output(s) to the light sources from the environment 100 to indicate a queue waiting time as described herein.

The display devices 216 can be disposed throughout the store 202 and can render an image to provide an indication of queue waiting times for the POS terminals 206. As an example, in some embodiments, the display devices 216 can render graphics/icons, numeric values of the estimated queue times, and/or any other indicators that can provide an indication of the estimated queue times of the POS terminals 206. The display device 216 can render the image(s) in response to output(s) from the environment 100 received by the display devices 216. In some embodiments, the display device can include audio device (e.g., audio devices 218) and can be configured to output audio to provide an indication of the estimated queue waiting times as described in more detail below.

The audio devices 218 can be speakers disposed throughout the store 202 and can be output an audio indicator to provide an indication of queue waiting times for the POS terminals 206. In some embodiments, the audio devices 218 can output recorded and/or computer generated speech indicating queue wait times for the POS terminals 206. The audio device 206 can output indicators in response to output(s) from the environment 100 received by the audio devices 218.

The portable electronic devices 220 (e.g., mobile devices) can be programmed and/or configured to execute one or more software applications to interact with the environment 100 and can display one or more user interfaces to users of the portable electronic devices 220 to provide an indication of a queue characteristic (e.g., depth/length of the queue, an estimated queue wait time, etc.) and/or to provide a recommended POS terminal based on the queue characteristics and customer specific information (e.g., customer specific criteria/preferences 170). The devices 220 can be configured for wireless communication, and can be, for example, a tablet, a laptop computer, mobile phone, and/or any other suitable portable electronic device configured for wireless communication.

As shown in FIG. 2, a customer 222 can carry one of the portable electronic devices 220, such as a smart phone or tablet computer, through the store 202 and the portable electronic device 220 can include a web browser that allows the customer 222 to navigate to one or more graphical user interfaces (GUI) provided by the environment 100 and/or can include an application specific to the environment 100 (e.g., a mobile application) to provide GUIs to the customer. The GUIs can display the indicators to the customer. In some embodiments, the GUIs can allow the customer to specify one or more customer specific parameters that can be used by the environment 100 to recommend one or more POS terminals to the customer. As one example, the GUIs can allow the customer to specify preferred POS terminal types (e.g., a lane preference types), such as self-checkout terminals, terminals that do not permit credit card transactions, terminals that only permit credit card only transaction, terminals at which tobacco products are available, terminals having a limit on the quantity of items customers can purchase at the terminal per transaction, and/or any other suitable POS terminal types. As another example, customers can specify preferred employees (e.g., cashiers) operating the POS terminals. The environment 100 can generate recommended POS terminals based on the estimated queue wait times and the customer specific parameters. In some embodiments, the GUIs can be configured to request feedback from the customers regarding their experience at the store including a performance of the employees (e.g., an option to rate the experience can be offered). The feedback can be used to implement a store and/or employee recognition system and/or to access and correct performance issues at the store and/or with an employee.

In exemplary embodiments, an employee 224 of the store can carry one of the portable electronic devices 220, which can be a handheld electronic device having store specific applications included therein. In some embodiments, the handheld electronic device carried by the employee 224 can be a smart phone or a tablet computer. The portable electronic device 220 can include a web browser that allows the employee 224 to navigate to a GUI provided by the environment 100 and/or can include an application specific to the environment 100 to provide a GUI to the customer. The GUI can dynamically, for example, in real-time, display the indicators and/or reports to the employee regarding the estimated queue waiting times and/or other performance metrics associated with the store. For example, the GUI can display current estimated queue times, which POS terminals are open, which employees are operating the POS terminals, which customers are utilizing the environment 100, recent customer feedback submitted to the environment 100, and/or any other suitable information/data. In some embodiments, the graphical user interface can allow the employee to specify one or more store specific parameters that can be used by the environment 100 when calculating and/or indicating the estimated waiting times and/or when providing POS terminal recommendations to the customers.

Figure 3:
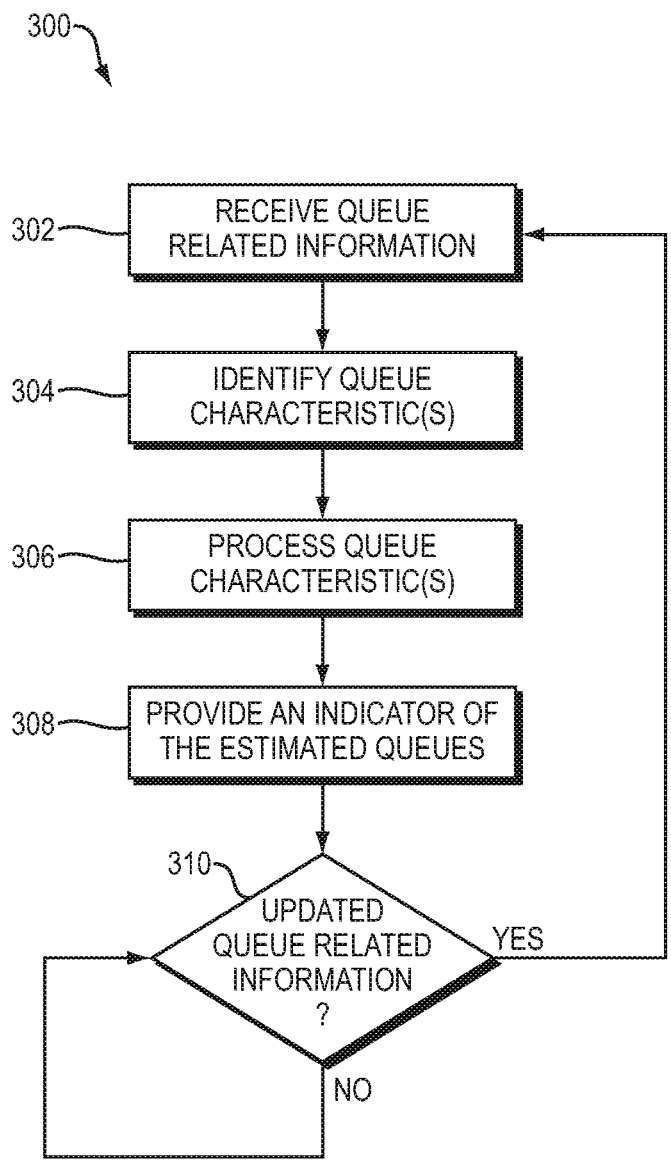
FIG. 3 is a flowchart illustrating an exemplary process for indicating queue characteristic in accordance with exemplary embodiments of the present disclosure.

FIG. 3 is a flowchart illustrating an exemplary process 300 for indicating queue characteristic, which can be electronically implemented by computer-readable instructions according to embodiments of the environment 100. At step 302, the environment 100 can receive queue-related information from one or more data sources as inputs. For example, the environment 100 can receive queue related information from POS terminals, databases, sensors, video camera (or device performing video analytics), and/or any other suitable source. At step 304, the characterization engine 110 can programmatically process the information to identify and/or generate and output queue characteristics for the POS terminals in a store. For example, the engine can generate and output an estimated queue wait time for the POS terminals in the store based on the queue-related information. The characterization engine 110 can apply one or more weighting factors, biasing factors, and/or any other suitable factors (e.g., self-checkout factors) when generating and/or identifying the queue characteristics to adjust and/or provide compensation to the queue characteristics. At step 306, the management engine 120 can receive as an input and process the queue characteristics identified and/or generated by the characterization engine 110, and at step 308, the management engine 120 can output one or more signals to indicator devices to provide indicators (e.g., light sources, displayed values, graphics/ions, audio, etc.) associated with the queue characteristics to the customers and/or the employees of the store as described herein. At step 310, the environment 100 can determine whether the queue-related information has been updated. If so, the environment 100 can be programmed to repeat the process from step 302. Otherwise, the environment 100 can periodically check for updated queue-related information.

Figure 4:
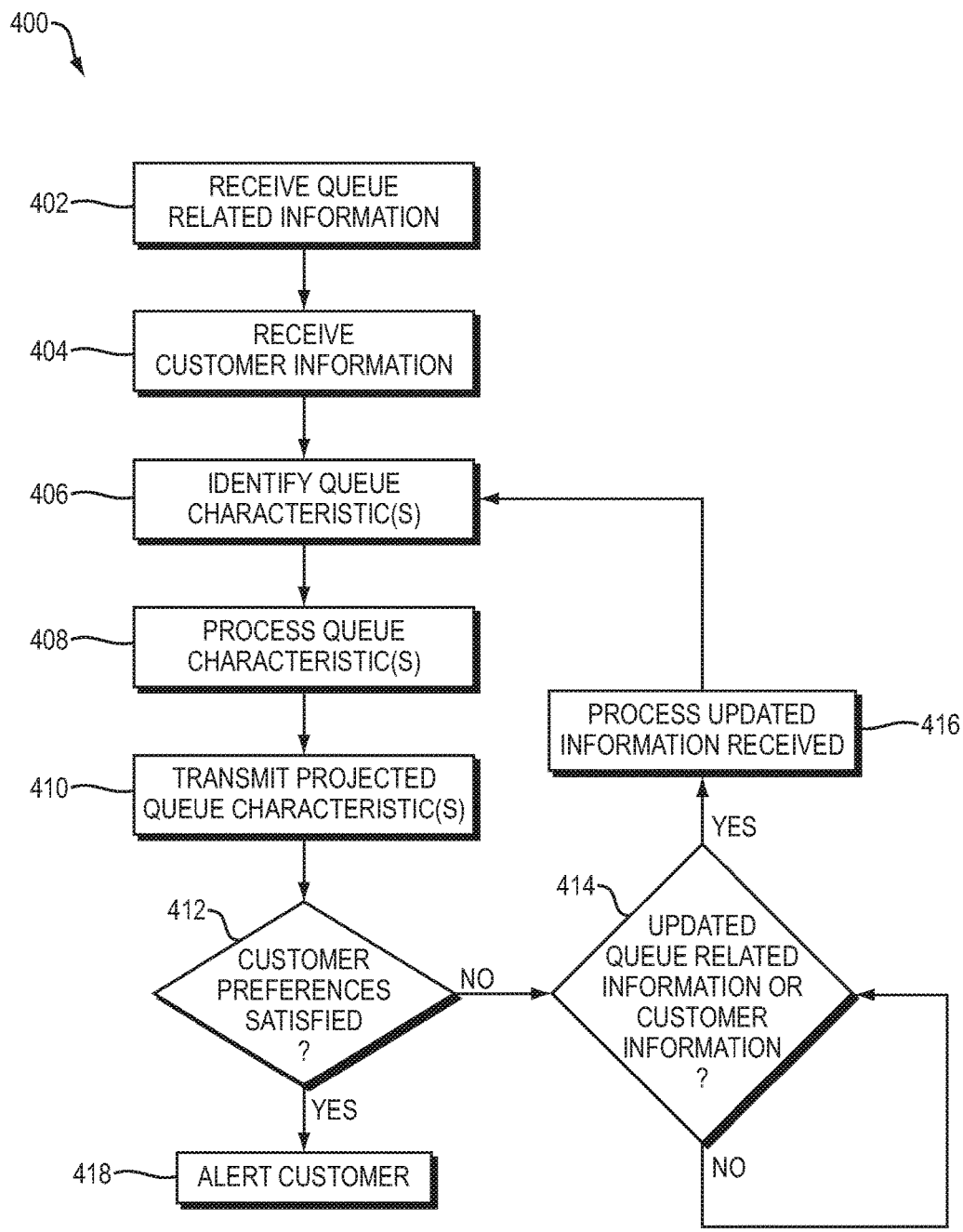
FIG. 4 is a flowchart illustrating another exemplary process for indicating queue characteristic in accordance with exemplary embodiments of the present disclosure.

FIG. 4 is a flowchart illustrating another exemplary process 400 for indicating queue characteristics, which can be electronically implemented by computer-readable instructions according to embodiments of the environment 100. At step 402, the environment 100 can receive queue-related information as an input from one or more data sources, and at step 404, the environment 100 can receive customer specific preferences/criteria as an input. For example, the environment 100 can receive queue related information from POS terminals, databases, sensors, video camera (or device performing video analytics), and/or any other suitable source and can receive customer preferences/criteria from one or more electronic devices operated by the user. At step 406, the characterization engine 110 can programmatically process the queue-related information to identify and/or generate queue characteristics for the POS terminals in a store. For example, the engine can generate and output an estimated queue wait time for the POS terminals in the store based on the queue-related information. The characterization engine 110 can apply one or more weighting factors, biasing factors, and/or any other suitable factors (e.g., self-checkout factors) when generating and/or identifying the queue characteristics to adjust and/or provide compensation to the queue characteristics.

At step 408, the management engine 120 can process the queue characteristics identified and/or generated by the characterization engine 110, and at step 410, the management engine 120 can generate and transmit a forecast of the queue characteristics, directly or indirectly through an intermediate device, to an electronic device operated by the customer to provide the customer with an indicator corresponding to a projected queue characteristic. At step 412, the management engine 120 can be determine whether the customer preference/criteria has been satisfied. If not, the management engine 120 can determine whether updated queue-related information and/or customer specific information is available at step 414. If updated information is available, the environment 100 can process the updated information at step 416 and the process can repeat from step 406. Otherwise, the environment 100 can periodically check for updated information or wait for new information to be provided. When the customer preference/criteria has been satisfied, the management engine 120 can transmit an alert to an electronic device operated by the customer at step 418 to indicate that one or more of the POS terminals have queue characteristics that satisfies the customer preference/criteria. For example, the alert can provide instructions to the electronic device operated by the customer to display one or more indicators associated with the queue characteristics to the customers. For example, no wait at self-checkout, no wait at register five, new register opened.

Figure 5:
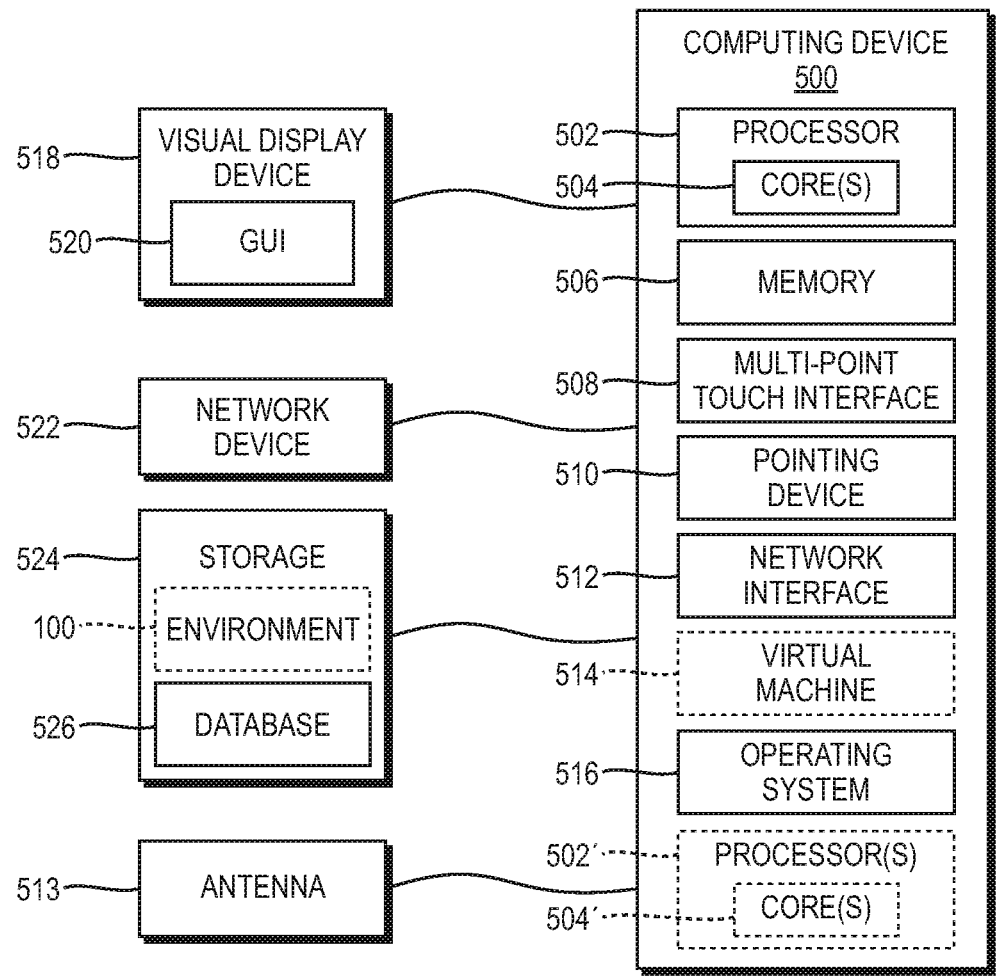
FIG. 5 is a block diagram of an exemplary computing device for implementing exemplary embodiments of the retail sales system.

FIG. 5 is a block diagram of an exemplary computing device 500 that may be used to implement an exemplary embodiment of the environment 100, for example, in the an embodiment of the retail sales system 200. The computing device 500 includes one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives), and the like. For example, memory 506 included in the computing device 500 may store computer-readable and computer-executable instructions or software for implementing exemplary embodiments of the environment 100. The computing device 500 also includes configurable and/or programmable processor 502 and associated core 504, and optionally, one or more additional configurable and/or programmable processor(s) 502' and associated core(s) 504' (for example, in the case of computer systems having multiple processors/cores), for executing computer-readable and computer-executable instructions or software stored in the memory 506 and other programs for controlling system hardware. Processor 502 and processor(s) 502' may each be a single core processor or multiple core (504 and 504') processor.

Virtualization may be employed in the computing device 500 so that infrastructure and resources in the computing device may be shared dynamically. A virtual machine 514 may be provided to handle a process running on multiple processors so that the process appears to be using only one computing resource rather than multiple computing resources. Multiple virtual machines may also be used with one processor.

Memory 506 may include a computer system memory or random access memory, such as DRAM, SRAM, EDO RAM, and the like. Memory 506 may include other types of memory as well, or combinations thereof.

A customer may interact with the computing device 500 through a visual display device 518, such as a computer monitor, which may display one or more user interfaces 520 that may be provided in accordance with exemplary embodiments. The computing device 500 may include other I/O devices for receiving input from a customer, for example, a keyboard or any suitable multi-point touch interface 508, a pointing device 510 (e.g., a mouse). The keyboard 508 and the pointing device 510 may be coupled to the visual display device 518. The computing device 500 may include other suitable conventional I/O peripherals.

The computing device 500 may also include one or more storage devices 524, such as a hard-drive, CD-ROM, or other computer readable media, for storing data and computer-readable instructions and/or software that implement exemplary embodiments of the environment 100 described herein. Exemplary storage device 524 may also store one or more databases for storing any suitable information required to implement exemplary embodiments. For example, exemplary storage device 524 can store one or more databases 526 for storing information, such as queue-related information, customer specified preferences/criteria, queue characteristics, and the like. The databases may be updated manually or automatically at any suitable time to add, delete, and/or update one or more items in the databases.

The computing device 500 can include a network interface 512 configured to interface via one or more network devices 522 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections (including via cellular base stations), controller area network (CAN), or some combination of any or all of the above. In exemplary embodiments, the computing device 500 can include one or more antennas 513 to facilitate wireless communication (e.g., via the network interface) between the computing device 500 and a network. The network interface 512 may include a built-in network adapter, network interface card, PCMCIA network card, card bus network adapter, wireless network adapter, USB network adapter, modem or any other device suitable for interfacing the computing device 500 to any type of network capable of communication and performing the operations described herein. Moreover, the computing device 500 may be any computer system, such as a workstation, desktop computer, server, laptop, handheld computer, tablet computer (e.g., the iPad™ tablet computer), mobile computing or communication device (e.g., the iPhone™ communication device), or other form of computing or telecommunications device that is capable of communication and that has sufficient processor power and memory capacity to perform the operations described herein.

The computing device 500 may run any operating system 516, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the computing device and performing the operations described herein. In exemplary embodiments, the operating system 516 may be run in native mode or emulated mode. In an exemplary embodiment, the operating system 516 may be run on one or more cloud machine instances.

Figure 6:
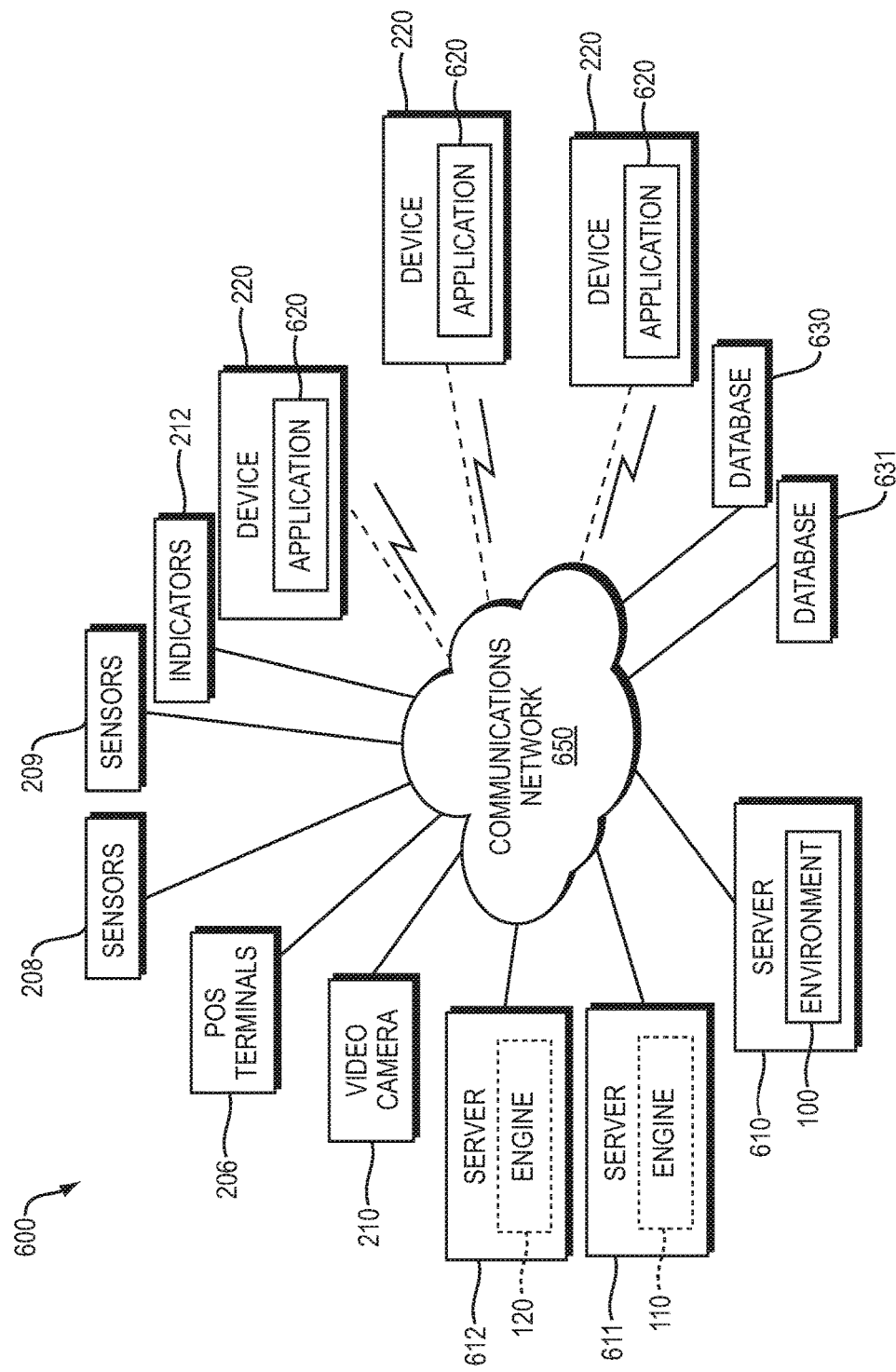
FIG. 6 is a client-server environment configured to implement one or more embodiments of the retail sales system.

FIG. 6 is a client-server environment 600 configured to implement one or more embodiments of the environment 100, for example, in an embodiment of the retail sales system 200. The environment 600 includes servers 610-612 operatively coupled to the POS terminals 206, sensors 208, video cameras 210, indicator devices 212, and portable electronic devices 220, via a communication network 650, which can be any network over which information can be transmitted between devices communicatively coupled to the network. For example, the communication network 650 can be the Internet, Intranet, virtual private network (VPN), wide area network (WAN), local area network (LAN), and the like. The environment 600 can include repositories or databases 630, 631, which can be operatively coupled to the servers 610-612, as well as to the POS terminals 206 and/or the portable electronic devices 220, via the communications network 650. The servers 610-612, POS terminals 206, portable electronic devices 220, and databases 630, 631 can each be implemented as a computing device. Those skilled in the art will recognize that the databases 630, 631 can be incorporated into one or more of the servers 610-612 such that one or more of the servers can include databases.

In an exemplary embodiment, the environment 100 can be implemented by the server 610. In some embodiments, the environment 100 can be distributed over different servers. For example, the engines 110 can be implemented on the server 611 and the management engine 120 can be implemented on the server 612.

As shown in FIG. 6, the portable electronic devices 220 can each include a client side application 620 programmed and/or configured to interact with the server 610. In one embodiment, the client-side application 620 implemented by the devices 220 can be a web-browser capable of navigating to one or more web pages hosting GUIs of the environment 100. In some embodiments, the client-side application 620 implemented by one or more of the devices 220 can be an application specific to the environment 100 installed on the devices 220 to permit interaction with the environment 100.

The databases 630-631 can store information for use by the environment 600. For example, the databases 630-631 can store queue-related information, customer specified preferences/criteria, queue characteristics, and the like.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component or step. Likewise, a single element, component or step may be replaced with a plurality of elements, components or steps that serve the same purpose. Moreover, while exemplary embodiments have been shown and described with references to particular embodiments thereof, those of ordinary skill in the art will understand that various substitutions and alterations in form and detail may be made therein without departing from the scope of the invention. Further still, other embodiments, functions and advantages are also within the scope of the invention.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A computer-implemented method of indicating queue characteristics for electronic terminals, the method comprising:

monitoring, via an entryway sensor disposed at an entryway of a facility, a customer entering the facility through the entryway based on a wireless transmission from a first mobile electronic device associated with the customer;

monitoring, via a first sensor, a presence of a first quantity of users in a first set at a first location in the facility, the first sensor disposed at a conveyor belt associated with a terminal in the facility;

monitoring, via a video camera, a presence of a second quantity of users in a second set at a second location in the facility, the video camera disposed to capture video of an area including at least one of a plurality of active terminals disposed at the second location and the second quantity of users;

estimating, via a computing device operatively coupled to the video camera through a communications network, a length of a queue in the second location of the facility based on detection of the second quantity of users in the second set at the second location using video received from the video camera;

obtaining, via the computing device operatively coupled to the first sensor and the video camera through the communications network, contemporaneous employee information associated with a performance of each cashier operating an active terminal based on at least one of a quantity of items processed per customer, a physical size of items being handled by each cashier, or a type of item entry being utilized by each cashier;

generating, by the computing device, queue characteristics for the plurality of active terminals in the facility based on the first quantity of users in the first set at the first location monitored based on the first sensor, the length of the queue at the second location, and the contemporaneous employee information;

generating indicators for the plurality of active terminals to indicate the queue characteristics of the plurality of active terminals, wherein the indicators are light sources disposed proximate to the plurality of active terminals;

controlling the light sources to energize or de-energize the light sources according to the queue characteristics;

receiving at least one preference from the first mobile electronic device or a second electronic device operated by the customer, wherein the at least one preference includes at least one of a preferred terminal type, a preferred cashier operating an active terminal, or a preferred queue length;

processing, via the computing device, the customer specified at least one preference to compare the at least one preference to the queue characteristics;

obtaining, via the computing device, a location of the first mobile electronic device using a positioning system;

determining, via the computing device, a closest active terminal within a predefined distance to the entryway that has a most favorable queue characteristic based on the customer specified at least one preference and the location of the first mobile electronic device; and transmitting, via the computing device, a notification to the first mobile electronic device of the closest active terminal within the predefined distance to the entryway that has the most favorable queue characteristic, wherein the notification appears on a graphical user interface of the first mobile electronic device.

2. The method of claim 1, wherein the computing device generates the queue characteristics based on queue-related information comprising at least one of contemporaneous electronic terminal information or historical electronic terminal information.

3. The method of claim 1, wherein the computing device generates the queue characteristics based on queue-related information comprising at least one of contemporaneous cashier information or historical cashier information.

4. The method of claim 1, wherein the queue characteristics comprise an estimated queue wait time for each of the active terminals.

5. The method of claim 1, wherein the light sources output a green light to indicate a favorable queue characteristic, a yellow light to indicate a neutral queue characteristic, or a red light to indicate a unfavorable queue characteristic.

6. The method of claim 1, the method further comprises:
displaying the indicators via at least one display unit in the store.

7. The method of claim 1, further comprising outputting the queue characteristics to an employee scheduling system.

8. The method of claim 1, further comprising transmitting the queue characteristics for display on the first mobile electronic device in communication with the computing device.

9. A non-transitory computer-readable medium storing instructions, wherein execution of the instructions by a processing device causes the processing device to implement a process of indicating queue characteristics comprising:

monitoring, via an entryway sensor disposed at an entryway of a facility, a customer entering the facility through the entryway based on a wireless transmission from a first mobile electronic device associated with the customer;

monitoring, via a first sensor, a presence of a first quantity of users in a first set at a first location in the facility, the first sensor disposed at a conveyor belt associated with a terminal in the facility;

monitoring, via a video camera, a presence of a second quantity of users in a second set at a second location in the facility, the video camera disposed to capture video of an area including at least one of a plurality of active terminals disposed at the second location and the second quantity of users;

estimating, via a computing device operatively coupled to the video camera through a communications network, a length of a queue in the second location of the facility based on detection of the second quantity of users in the second set at the second location using video received from the video camera;

obtaining, via the computing device operatively coupled to the first sensor and the video camera through the communications network, contemporaneous employee information associated with a performance of each cashier operating an active terminal based on at least one of a quantity of items processed per customer, a physical size of items being handled by each cashier, or a type of item entry being utilized by each cashier;

generating, by the computing device, queue characteristics for the plurality of active terminals in the facility based on the first quantity of users in the first set at the first location monitored based on the first sensor, the length of the queue at the second location, and the contemporaneous employee information;

generating indicators for the plurality of active terminals to indicate the queue characteristics of the plurality of active terminals, wherein the indicators are light sources disposed proximate to the plurality of active terminals;

controlling the light sources to energize or de-energize the light sources according to the queue characteristics;

receiving at least one preference via the first mobile electronic device or a second electronic device operated by the customer, wherein the at least one preference includes at least one of a preferred terminal type, a preferred cashier operating an active terminal, or a preferred queue length;

processing, via the computing device, the customer specified at least one preference to compare the at least one preference to the queue characteristics;

obtaining, via the computing device, a location of the first mobile electronic device using a positioning system;

determining, via the computing device, a closest active terminal within a predefined distance to the entryway that has a most favorable queue characteristic based on the customer specified at least one preference and the location of the first mobile electronic device; and transmitting, via the computing device, a notification to the first mobile electronic device of the closest active terminal within the predefined distance to the entryway that has the most favorable queue characteristic, wherein the notification appears on a graphical user interface of the first mobile electronic device.

10. The medium of claim 9, wherein the computing device generates the queue characteristics based on queue-related information comprising at least one of contemporaneous terminal information, historical terminal information, contemporaneous cashier information, or historical cashier information.

11. The medium of claim 9, wherein the queue characteristics comprise an estimated queue wait time for each of the active terminals.

12. The medium of claim 9, wherein the processing device programmatically associates at least one indicator with a first active terminal of the plurality of active terminals to indicate the queue characteristics of the first active terminal, wherein the at least one indicator indicates whether the first active terminal has a favorable queue characteristic, a neutral queue characteristic, or an unfavorable queue characteristic.

13. A queue monitoring system for indicating queue characteristics of electronic terminals comprising:
  a first sensor disposed at the first location of a facility and configured to monitor a presence of a first quantity of users in a first set at a first location in the facility, wherein the first location is a conveyor belt associated with a terminal in the facility;
  an entryway sensor disposed at an entryway of the facility;
  a video camera disposed at a second location of the facility and configured to monitor a presence of a second quantity of users in a second set at the second location, wherein at least one of a plurality of active terminals is disposed at the second location and the video camera is disposed with respects to the at least one of the plurality of active terminals to capture a video of the second quantity of users;
  a computing device operatively coupled to the first sensor, the entryway sensor, and the video camera through a communications network, is programmed to execute the instructions to:
    monitor, via the entryway sensor, a customer entering the facility through the entryway based on a wireless transmission from a first mobile electronic device associated with the customer;
    determine a length of a queue in the second location of the facility based on detection of the second quantity of users in the second set at the second location using video received from the video camera;
    obtaining contemporaneous employee information associated with a performance of each cashier operating an active terminal based on at least one of a quantity of items processed per customer, a physical size of items being handled by each cashier, or a type of item entry being utilized by each cashier;
    generate queue characteristics for the plurality of active terminals in the facility based on the first quantity of users in the first location monitored by the first sensor, the length and a depth of the queue at the second location, and the contemporaneous employee information;
    generating indicators for the plurality of active terminals to indicate the queue characteristics of the plurality of active terminals, wherein the indicators are light sources disposed proximate to the plurality of active terminals;
    controlling the light sources to energize or de-energize the light sources according to the queue characteristics;
    programmatically generate indicators for the plurality of active terminals to indicate the queue characteristics of the plurality of active terminals;
    transmit the queue characteristics for display on the first mobile electronic device in communication with the computing device;
    receive at least one preference via the first mobile electronic device operated by the customer, wherein the at least one preference includes at least one of a preferred terminal type, a preferred cashier operating an active terminal, or a preferred queue length;
    process the customer specified at least one preference to compare the at least one preference to the queue characteristics;
    obtain a location of the first mobile electronic device using a positioning system;
    determine a closest active terminal within a predefined distance to the entryway that has a most favorable queue characteristic based on the customer specified at least one preference and the location of the first mobile electronic device; and
    transmit a notification to the first mobile electronic device of the closest active terminal within the predefined distance to the entryway that has the most favorable queue characteristic, wherein the notification appears on a graphical user interface of the first mobile electronic device.

14. The system of claim 13, further comprising at least one indicator device configured to output the indicators based on the association between the indicators and the plurality of active terminals.

15. The system of claim 14, wherein the at least one indicator device indicates whether one of the electronic terminals has a favorable queue characteristic, a neutral queue characteristic, or an unfavorable queue characteristic.

16. The system of claim 13, the computing device further configured to:
  determine, based on the location information, a closest active terminal within a predefined distance to the electronic device that has a most favorable queue characteristic based on the customer specified at least one preference.

\* \* \* \* \*